Feb. 17, 1931.  M. D. FITZGERALD  1,793,423
CYLINDER HEAD GASKET
Filed Aug. 7, 1929

Inventor
Martin D. Fitzgerald
By Sturtevant & Mason
Attorneys

Patented Feb. 17, 1931

1,793,423

UNITED STATES PATENT OFFICE

MARTIN D. FITZGERALD, OF TORRINGTON, CONNECTICUT, ASSIGNOR TO THE FITZGERALD MANUFACTURING COMPANY, OF TORRINGTON, CONNECTICUT, A CORPORATION OF CONNECTICUT

CYLINDER-HEAD GASKET

Application filed August 7, 1929. Serial No. 384,179.

The invention relates to new and useful improvements in a gasket for internal combustion engines, and more particularly to a gasket adapted to be placed between the cylinder head and the cylinder block in a multiple cylinder engine.

It is well known that the chambers in the cylinder block associated with each cylinder are very close together and that difficulty is sometimes experienced in maintaining a tight joint between the cylinder head and block in this narrow region separating the adjacent cylinder chambers. An object of the present invention is to provide a gasket for a multiple cylinder engine wherein the portion of the gasket lying between the cylinder openings is reinforced and strengthened by an inserted metal sheathing which partially surrounds the packing completely housing the opposite edges thereof so as to prevent any possible chance of leakage from one cylinder chamber to the next adjacent chamber.

In the drawings:—

The invention is directed to a gasket for internal combustion engines and more particularly to a gasket for a multiple cylinder engine. The gasket is provided with an opening for each cylinder and consists of a sheet of packing of asbestos or other fibrous material with a pliable metal plate on each face of said packing. The invention is directed particularly to a reinforcing sheathing which is used in the region of the gasket between adjacent openings therein. This sheathing is in the form of a pliable metal plate which extends across one face of the packing and is folded through the openings and across the edges of the packing. The packing after the sheathing has been applied thereto then has the pliable metal plates placed on the opposite faces thereof and the plate at one side is folded through the opening and bent so as to overlap the plate at the other side.

Referring more in detail to the drawings, the invention is shown as applied to a gasket consisting of a body portion 1 which is provided with cylinder openings, one of which is indicated at 2. The gasket is also provided with openings for securing bolts which are of the usual character. The gasket consists of an inner sheet of packing 3, an inserted sheathing plate 4 and two covering plates 5 and 6. The sheet of packing is provided with suitable openings conforming to the chamber in the cylinder block associated with each cylinder.

Figure 1:
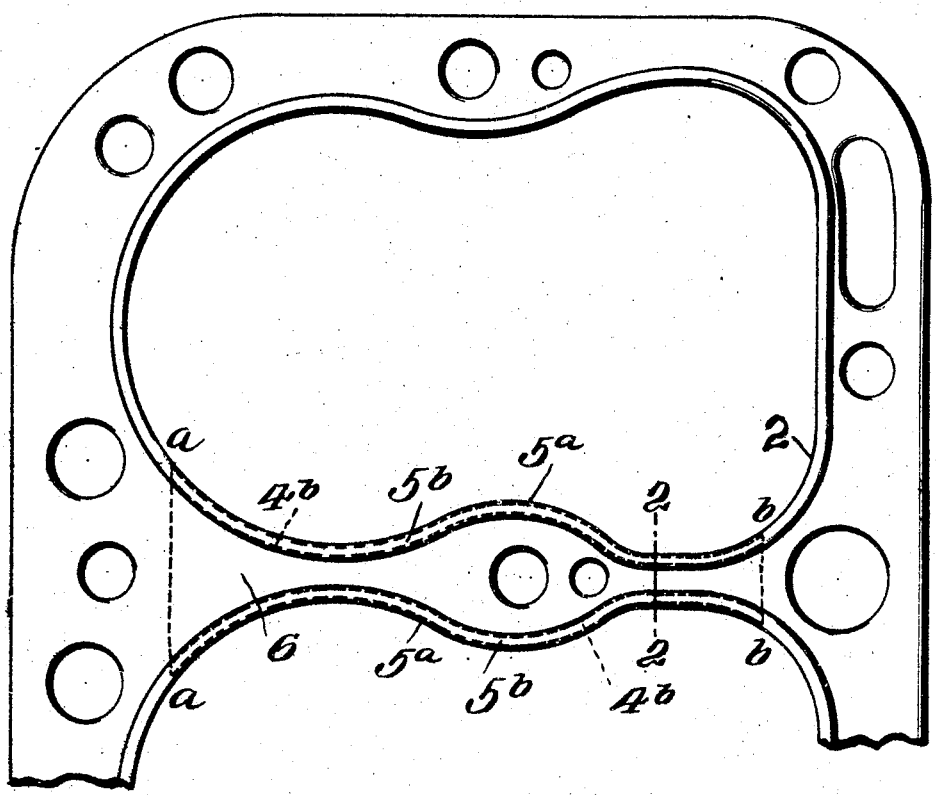
Figure 1 is a plan view of a portion of a gasket embodying the improvements.

The present invention is directed to a sheathing for strengthening that portion of the gasket between the lines $a$—$a$ and $b$—$b$ in Fig. 1 of the drawings. The sheathing is made of any suitable pliable metal, preferably copper. It is first placed against the under face of the sheet of packing in the region referred to and the edges are turned up through the openings in the sheet of packing as indicated at $4a$, $4a$. These edge portions $4a$ are folded over onto the upper face of the sheet of packing as indicated at $4b$, $4b$.

Figure 2:
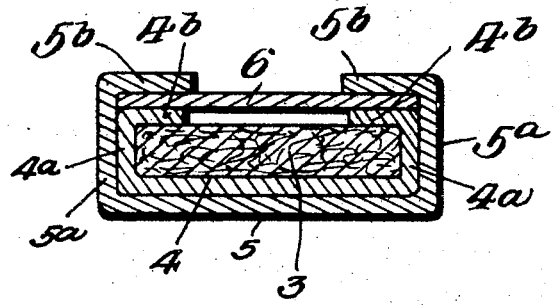
Fig. 2 is a sectional view on the line 2—2 of Fig. 1.
Figure 3:
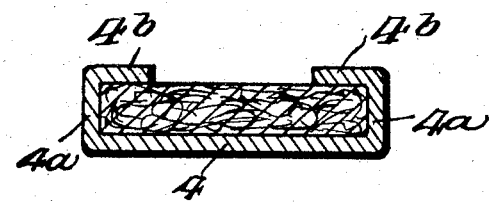
Fig. 3 is a sectional view through the packing and the sheathing prior to the applying of the pliable covering metal parts thereto.

The plate 6 is preferably of copper and this is cut to conform to the shape of the sheet of packing and is placed on the upper face as indicated in Fig. 2. The plate 5 is also preferably made of copper and this plate is placed on the under face of the sheet of packing. The plate 5 is folded through the opening in the sheet of packing as indicated at $5a$ and is then folded over on top of the plate 6 as indicated at $5b$.

It will be noted that the plate 6 lies between the folded back end portions $4b$ and $5b$. The packing is completely housed at its side edges by this sheathing and for a distance all the way across the narrow portion of the gasket which joins the outer edge portions and lies between the cylinder openings. The under plate likewise completely houses the side edge portions of the gasket in this region. When the cylinder block is clamped against the gasket it will force said overlapping edge portions $5b$ into contact with the plate 6 and the plate 6 into contact with the overlapping portions $4b$ of the inserted sheathing, and thus the parts will be firmly pressed against the sheet of packing and a very tight joint made along this narrow partition wall between the cylinders.

The folding back of the sheathing and the outer plate increases the thickness of the metal at the side edges along the openings, and this insures a very tight gripping line of contact along each edge of the packing from the line a—a to the line b—b.

While I have shown the outer plates as connected by a folding of one plate through the opening and overlapping the other plate, it will be understood that these outer plates may be connected in any suitable way so long as the edge portions of the sheet of packing are completely housed by the connected plates. While I have shown the sheathing as extending across the bottom face of the portion of the sheet of packing to which it is applied, also across the edges thereof, and as lapping onto the upper face of said portion, it will be obvious that the manner of applying the metal sheathing may be varied without departing from the spirit of the invention as set forth in the appended claims. The essential feature consists in the substantial housing of both edge portions by a sheathing plate which extends across one face of the gasket from one side edge to the other side edge thereof.

Having fully described my invention, what I claim as new and desire to secure by Letters Patent, is:—

1. A gasket for internal combustion engines or the like including a sheet of packing material having a plurality of cylinder openings within its limits which are closely spaced relative to each other, an inserted metal sheathing covering the edge portions of said sheet of packing between the cylinder openings, a plate of pliable metal on each face of the sheet of packing and covering the same, said plates being in overlapped relation along each of the cylinder openings and completely enclosing said sheathing and packing between the cylinder openings.

2. A gasket for internal combustion engines or the like including a sheet of packing material having a plurality of cylinder openings within its limits which are closely spaced relative to each other, an inserted metal sheathing extending across the under face of the sheet of packing in the region between cylinder openings and folded through said openings onto the other face of said sheet of packing, a plate of pliable metal on each face of said sheet of packing and covering the same, said plates being in overlapped relation along each of the cylinder openings and completely enclosing said sheathing and packing between the cylinder openings.

In testimony whereof, I affix my signature.

MARTIN D. FITZGERALD.